United States Patent
Kleine-Hollenhorst (10) Patent No.: US 12,013,289 B2
(45) Date of Patent: Jun. 18, 2024

(54) DEVICE FOR MEASURING THE TEMPERATURE IN THE INTERIOR OF A VEHICLE

(71) Applicant: BEHR-HELLA THERMOCONTROL GMBH, Stuttgart (DE)

(72) Inventor: Holger Kleine-Hollenhorst, Lippstadt (DE)

(73) Assignee: BEHR-HELLA THERMOCONTROL GMBH, Lippstadt (DE)

( * ) Notice: Subject to any disclaimer, the term of this patent is extended or adjusted under 35 U.S.C. 154(b) by 637 days.

(21) Appl. No.: 17/274,634

(22) PCT Filed: Jul. 31, 2019

(86) PCT No.: PCT/EP2019/070591
§ 371 (c)(1),
(2) Date: Mar. 9, 2021

(87) PCT Pub. No.: WO2020/052857
PCT Pub. Date: Mar. 19, 2020

(65) Prior Publication Data
US 2022/0049993 A1 Feb. 17, 2022

(30) Foreign Application Priority Data
Sep. 11, 2018 (DE) .................... 10 2018 122 164.9

(51) Int. Cl.
*G01K 1/14* (2021.01)
*G01K 1/08* (2021.01)

(52) U.S. Cl.
CPC ................. *G01K 1/14* (2013.01); *G01K 1/08* (2013.01); *G01K 2201/02* (2013.01); *G01K 2205/00* (2013.01)

(58) Field of Classification Search
CPC ........ G01K 1/14; G01K 1/08; G01K 2201/02; G01K 2205/00
See application file for complete search history.

(56) References Cited

U.S. PATENT DOCUMENTS 1,373,859 A * 4/1921 Boyce ...................... G01K 1/14
374/E1.018
4,598,581 A * 7/1986 Brekke .................. G01K 1/146
73/756

(Continued)

FOREIGN PATENT DOCUMENTS

DE 103 12 077 B3 8/2004
DE 20 2004 002 427 U1 9/2004
(Continued)

OTHER PUBLICATIONS

International Search Report and Written Opinion issued in corresponding International Patent Application No. PCT/EP2019/070591 dated Oct. 31, 2019, with English translation of Search Report.

*Primary Examiner* — Nathaniel T Woodward
*Assistant Examiner* — Philip L Cotey
(74) *Attorney, Agent, or Firm* — BakerHostetler (57) ABSTRACT

A device for measuring the temperature in the interior of a vehicle is provided. The device includes an interior temperature sensor arranged at and/or in a plug-in end of a plug-in housing. The interior temperature sensor projects beyond the plug-in end of the plug-in housing. The plug-in housing is biased away from a cover element for assuming a defined plug-in position of the plug-in housing when the plug-in end of the plug-in housing is plugged into a receiving space of the latter and the interior temperature sensor is arranged in the through-going opening of the cover element.

14 Claims, 4 Drawing Sheets

(56) References Cited

U.S. PATENT DOCUMENTS

| | | | | |
|---|---|---|---|---|
| 5,117,744 | A * | 6/1992 | Zimmer | B60H 1/0075 |
| | | | | 250/203.4 |
| 8,246,246 | B2 * | 8/2012 | Wakabayashi | G01K 1/14 |
| | | | | 73/866.5 |
| 2002/0048308 | A1 * | 4/2002 | Knittel | G01K 13/00 |
| | | | | 374/185 |
| 2006/0022844 | A1 * | 2/2006 | Kawashima | G10K 11/004 |
| | | | | 340/943 |
| 2008/0289574 | A1 * | 11/2008 | Jacobs | G01K 7/02 |
| | | | | 118/708 |
| 2009/0133449 | A1 * | 5/2009 | Bard | G01K 1/14 |
| | | | | 70/1 |
| 2010/0067562 | A1 * | 3/2010 | Wakabayashi | G01K 1/14 |
| | | | | 374/208 |
| 2010/0284437 | A1 * | 11/2010 | Stoll | G01K 1/08 |
| | | | | 374/E1.018 |
| 2013/0034120 | A1 * | 2/2013 | Hentschel | G01K 1/20 |
| | | | | 374/142 |
| 2018/0058942 | A1 * | 3/2018 | Weigand | B60R 21/015 |
| 2022/0049993 | A1 * | 2/2022 | Kleine-Hollenhorst | ...... |
| | | | | G01K 1/14 |

FOREIGN PATENT DOCUMENTS

| | | |
|---|---|---|
| DE | 100 49 979 C5 | 12/2005 |
| DE | 10 2007 008 744 A1 | 9/2007 |
| DE | 10 2006 023 438 A1 | 11/2007 |
| DE | 10 2008 064 011 B3 | 7/2010 |
| DE | 10 2010 015 657 A1 | 10/2011 |
| DE | 10 2016 010 455 A1 | 3/2018 |
| EP | 1 195 275 A2 | 4/2002 |
| EP | 1 457 365 A2 | 9/2004 |
| EP | 2 199 125 A2 | 6/2010 |

* cited by examiner

DEVICE FOR MEASURING THE TEMPERATURE IN THE INTERIOR OF A VEHICLE

CROSS REFERENCE

This application is the U.S. National Phase under 35 U.S.C. § 371 of International Application No. PCT/EP2019/070591 filed on Jul. 31, 2019, which claims the benefit of German Application No. 10 2018 122 164.9 filed on Sep. 11, 2018, the entire contents of each are hereby incorporated by reference.

The invention relates to a device for measuring the temperature in the interior of a vehicle.

For automatically regulating the interior temperature in a vehicle it is necessary to sense the actual temperature in the vehicle interior or to have a measured variable which represents the actual value of the interior temperature. The actual value is compared to a predefined target value for the vehicle interior temperature. The deviation between the two values is compensated for by a regulator.

The vehicle interior temperature can be sensed by an interior temperature sensor which is subjected to an air flow that is taken in from the interior of the vehicle by a fan (ventilation motor) and is guided past the interior temperature sensor. However, such so-called ventilated interior temperature sensors have been replaced by "unventilated" interior temperature sensing systems for quite some time. An unventilated interior temperature sensor is typically arranged in a sensor housing which is thermally well coupled to the vehicle interior. Examples of unventilated interior temperature sensors are described in DE-C-100 49 979, DE-B-103 12 077, DE-A-10 2007 008 744, DE-B-10 2008 064 011, DE-A-10 2010 015 657, DE-A-10 2016 010 455, DE-U-20 2004 002 427, EP-B-1 457 365 and US-A-2006/0022844.

When components or component parts are assembled in the automobile industry it is desired to assemble these component parts or components with the aid of clip or snap or locking structures. However, component tolerances may lead to undesired incorrect positioning in the clipped or snapped or locked installation condition.

It is an object of the invention to provide a device for measuring the temperature in the interior of a vehicle, which device, in the assembled condition, is locked and whose assembly position is essentially defined independently of any tolerances.

For achieving this object, the invention suggests a device for measuring the temperature in the interior of a vehicle, comprising:
  a plug-in housing for plugging into a receiving means on the rear side of a cover element adjacent to the interior, wherein the receiving means comprises a receiving space and the cover element inside the receiving space comprises a through-going opening and the plug-in housing comprises a plug-in end for plugging into the receiving means,
  a locking means for lockingly connecting the plug-in housing to the receiving means with the plug-in end of the plug-in housing being plugged into the receiving space,
  an interior temperature sensor arranged at and/or in the plug-in end of the plug-in housing,
  wherein the interior temperature sensor projects beyond the plug-in end of the plug-in housing, and
  a biasing means for biasing the plug-in housing away from the cover element for assuming a defined plug-in position of the plug-in housing when the plug-in end of the plug-in housing is plugged into the receiving space when being locked with the receiving means and the interior temperature sensor is arranged in the through-going opening of the cover element.

The device according to the invention is provided with a plug-in housing serving for being plugged into a receiving means on the rear side of a cover element adjacent to the interior. The cover element can be part of an instrument panel or a center console or a so-called roof node of a vehicle, for example. On the rear side of the cover element a receiving space of the receiving means is located from where a through-going opening in the cover element extends to the front side thereof. The plug-in housing comprises a plug-in end which is inserted into the receiving means in the plug-in direction and thus serves for being received by the receiving means. The plug-in housing and the receiving means are adapted to be lockingly connected to each other. For this purpose, the device according to the invention comprises a corresponding locking means including locking bosses and locking recesses, for example, wherein at least one of these two cooperating components of the locking means is of an elastic configuration.

At and/or in the plug-in end of the plug-in housing an interior temperature sensor is located which is flush with the plug-in end of the plug-in housing or projects beyond the plug-in end of the plug-in housing.

According to the invention, either at the plug-in housing or its plug-in end or at the receiving means or the cover element or at any of the aforementioned components a biasing means or parts of a biasing means are provided with the aid of which the plug-in housing is biased away from the cover element when the plug-in end of the plug-in housing is received by the receiving means and the plug-in housing is locked with the receiving means. In this condition, the interior temperature sensor is located in the through-going opening of the cover element and is thus thermally coupled to the interior or to the air volume in the interior.

The biasing means biases the plug-in housing in the opposite direction to the plug-in direction (assembling direction) such that corresponding and mutually blocking locking surfaces, locking edges or similar locking means abut on each other thus defining the plug-in position of the plug-in housing in the receiving means.

The biasing means clearly defines the position of the plug-in housing's plug-in end comprising the interior temperature sensor. In particular, the biasing means further prevents the plug-in housing, in the assembled condition, from being received with a clearance and thus in a "loose" manner by the receiving means.

According to an advantageous embodiment of the invention, it is provided that the biasing means is arranged at the receiving means and/or at the plug-in housing and comprises at least one spring element which exerts a pressing force on the plug-in housing when abutting on the receiving means for defining the plug-in depth of the plug-in end of the plug-in housing in the receiving space of the receiving means.

The biasing means can be configured in different ways. In any case, it comprises at least one resettable biasing or spring element which can be configured as a helical pressure spring or as a yoke or leaf spring or as a flexible tongue or as an elastically compressible element or as a reversibly elastically deformable element.

According to an advantageous aspect of the invention, the biasing means comprises two spring elements arranged at the plug-in end of the plug-in housing on both sides of the interior temperature sensor for elastically abutting on the cover element on both sides of the through-going openings of the latter. The arrangement of the spring elements on both sides of the interior temperature sensor and the through-going opening in the cover element, respectively, results in a non-tilting positioning of the plug-in end of the plug-in housing in the receiving space of the receiving means. For further tilt prevention in the further dimension (for example, in the X- and the Y-plane when the Z-plane of the so defined coordinate system defines the axis of the plug-in direction) it can be advantageous to provide two pairs of spring elements respectively arranged on both sides of the interior temperature sensor, wherein the two spring element pairs are offset by 90° relative to each other.

According to an advantageous aspect of the invention, it can further be provided that each spring element is configured as a spring clip which is bent and comprises a convex as well as a concave side and that in the case of elastic abutment on the cover element and locking of the plug-in housing with the receiving means the concave sides of the spring clips are arranged such that they face the cover element. As already described above, the previously defined spring elements can either be arranged on the inside (rear side) of the cover element and/or at the plug-in end of the plug-in housing.

According to another embodiment of the invention, the receiving space of the receiving means can be constituted, besides the cover element which delimits this receiving space towards the interior of the vehicle (except for the through-going opening which connects the receiving space to the interior of the vehicle), also by a collar protruding from the rear side of the cover element and extending either continuously or discontinuously. This collar encloses the plug-in end of the plug-in housing when the latter is locked with the receiving means.

As a material for the plug-in housing, the locking means, the receiving means and the biasing means plastic material has proved successful such that the aforementioned element or components of the device according to the invention are made from this material or comprise this material.

According to another advantageous embodiment of the invention, the interior temperature sensor is arranged in a sensor housing or embedded in the material of the sensor housing, wherein the sensor housing at least partially projects beyond the plug-in end of the plug-in housing.

The aforementioned sensor housing comprises a front wall adjacent to the interior, wherein the interior temperature sensor is thermally coupled to the front wall of the sensor housing. Here, in particular in the sensor housing a radiation sensor (for example, in the form of a photo diode with or without an optical filter) can be provided for receiving in particular solar radiation for compensating for heating of the sensor housing caused by radiation to which the sensor housing is exposed and sensed by the interior temperature sensor. Further, a second temperature sensor can be arranged in the plug-in housing for sensing parasitic heating of the plug-in housing and/or the sensor housing for compensating for the effect on the temperature sensing by the interior temperature sensor.

Besides the interior temperature sensor and the possibly existing electric or electronic components, such as the radiation sensor and the second temperature sensor, the device according to the invention typically comprises further electric or electronic components serving for processing the measured signals. These components or component parts are typically arranged on a circuit board located in the plug-in housing and comprising a front end facing the plug-in end of the plug-in housing, wherein the plug-in housing comprises at its plug-in end a through-going opening through which the interior temperature sensor extends and projects beyond the plug-in end of the plug-in housing.

As already described above, according to the invention, the biasing means assists the plug-in housing in assuming a defined position when the latter locks with the receiving means. Typically and as an advantageous aspect of the invention, the locking device comprises at least one pair of cooperating locking surfaces extending at an angle, in particularly perpendicularly, to the plug-in direction, where the one locking surface is arranged at the plug-in housing, in particular the plug-in end of the plug-in housing, and the other locking surface is arranged at the receiving means, in particular at a collar at least also defining the receiving space of the receiving means and protruding from the cover element, and wherein the plug-in housing, after its locking surface, when being plugged into the receiving means, has been moved past the locking surface of the latter and with a biasing force or another biasing force being generated by the biasing means, is adapted to be further advanced in the plug-in direction until it is blocked by the cover element and is adapted to be automatically moved back due to the biasing force of the biasing means until the locking surface of the plug-in housing abuts on the locking surface of the receiving means.

For the interior temperature sensor to assume the exact position in the installed condition of the device it is further advantageous when the plug-in housing comprises, at its rear end facing away from the plug-in end, a closing element, in particular a plug cage, for receiving a plug for the electric connection and the closing element comprises a biasing means for biasing the circuit board towards the plug-in end of the plug-in housing, wherein it can in particular be provided that the biasing means of the closing element comprises at least one spring tongue for elastically abutting on the rear end of the circuit board. Thereby, the position of the circuit board and thus the interior temperature sensor relative to the plug-in housing and their position relative to the receiving means are definedly assumed.

Hereunder the invention will be explained in detail on the basis of an exemplary embodiment with reference to the drawing in which.

Figure 1:
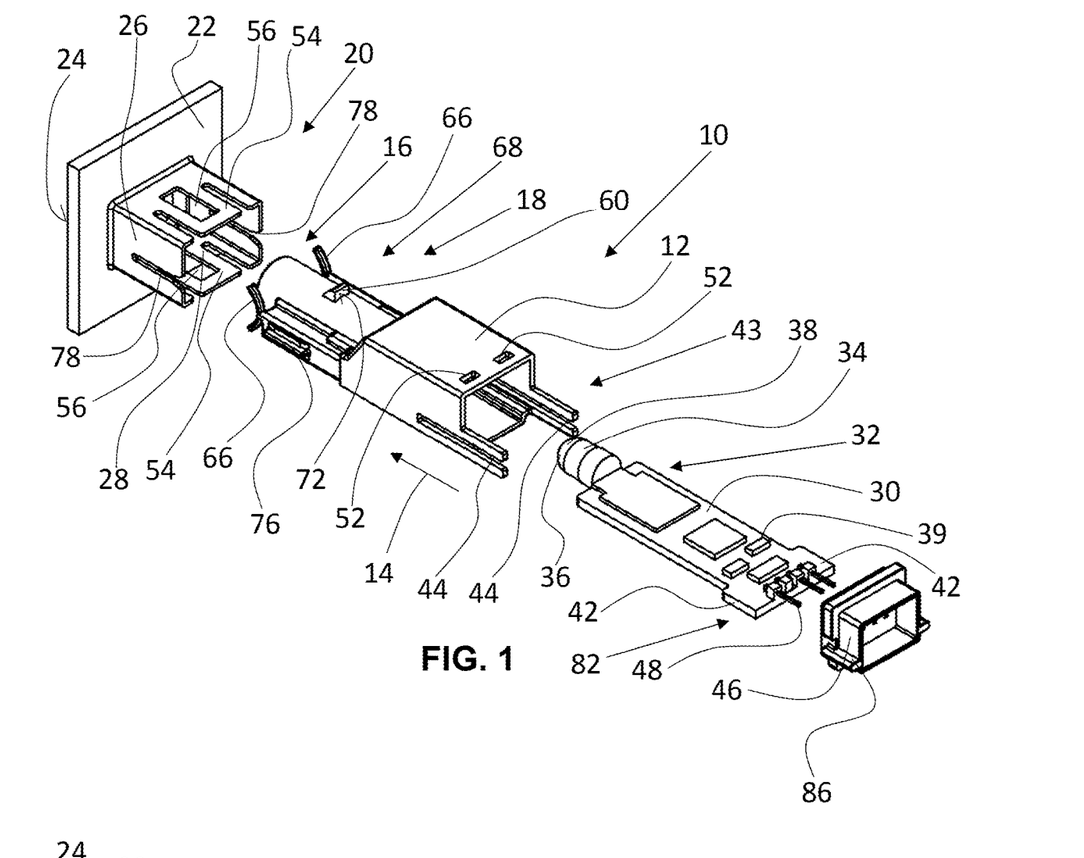
FIG. 1 shows a perspective exploded view of the individual components of a device for measuring the temperature in the interior of a vehicle according to an exemplary embodiment of the invention.
Figure 2:
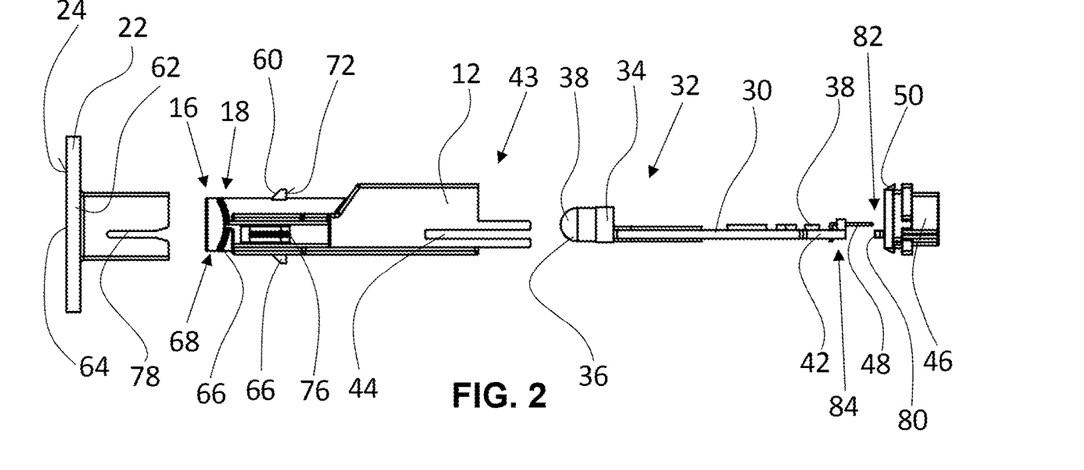
FIG. 2 shows an exploded side view of the individual components of FIG. 1.

FIGS. 1 and 2 show a perspective and a side view of the components of a device 10 for measuring the temperature in the interior of a vehicle. The device 10 comprises a plug-in housing 12 including, in the insertion direction 14, a front plug-in end 16 having a biasing means 18 which is activated and generates a biasing force in a direction opposite to the plug-in direction 14 when the plug-in housing 12 is plugged into a receiving means 20 of a cover element 22. The cover element 22 can be part of an instrument board or the center console or the roof node in the interior of a vehicle or, as an element, can be connected to the aforementioned components. The front side 24 of the cover element 22 is thus adjacent to the interior. The receiving means 20 comprises a multiply slotted circumferential collar 26 which, together with the cover element 22, defines a receiving space 28 for the plug-in end 16 of the plug-in housing 12.

In the plug-in housing 12 a circuit board 30 is received which at its front end 32 facing the plug-in end 16 in its received condition comprises a sensor housing 34 extending beyond said front end. The sensor housing 34 is made from a plastic material, for example. In this exemplary embodiment, an interior temperature sensor 36 as well as a radiation sensor 38 are embedded in the plastic material of the plug-in housing 34. On the circuit board 30 another temperature sensor 39 can be arranged. The cooperation of all these sensors and detectors for determining a value representing the temperature in the interior of the vehicle is generally known for unventilated interior temperature systems and will thus not be explained in detail here. The circuit board 30 can comprises further electronic elements, such as e.g. a bus interface (e.g. LIN or CAN) for supplying data/signals representing the interior temperature via a communication bus of the electronic climate control system.

Figure 3:
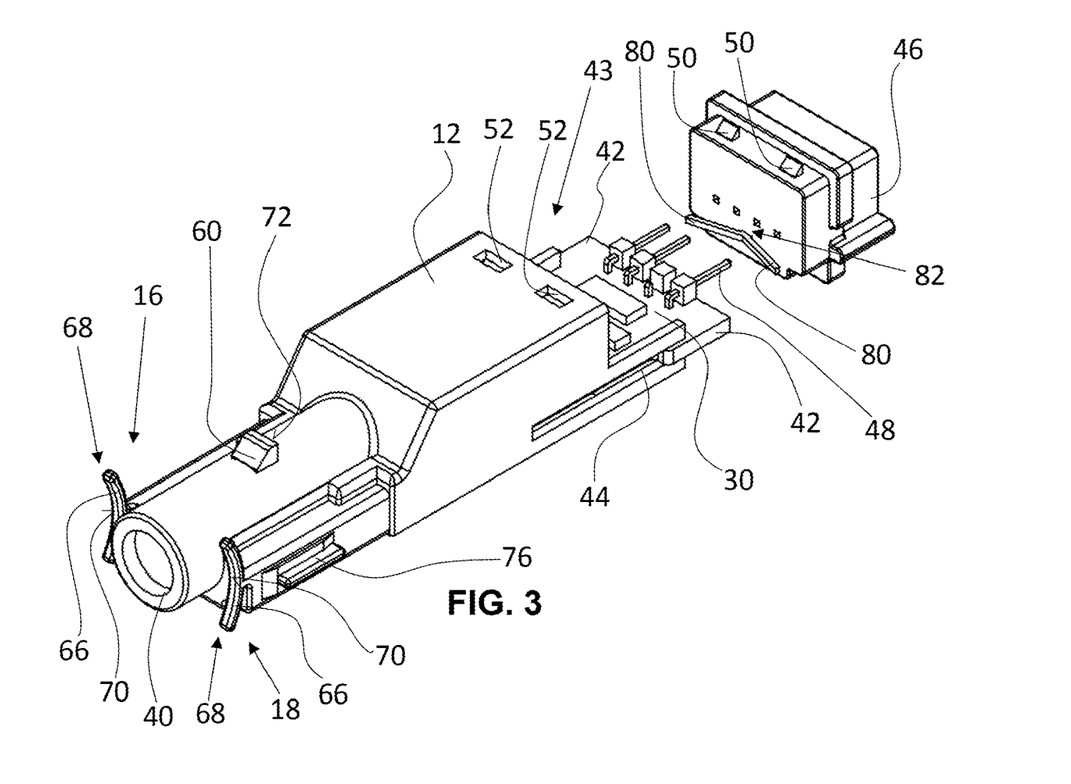
FIG. 3 shows a perspective view of the plug-in housing of the device with a biasing means arranged at the plug-in end and with the circuit board as well as the plug cage comprising a biasing means for the circuit board.

The interior temperature sensor 36 projecting beyond the front end 32 of the circuit board 30 extends through a through-going opening 40 at the plug-in end 16 of the plug-in housing 12 (see FIG. 3, for example).

The positioning of the circuit board 30 inside the plug-in housing 12 can be realized by lateral guiding projections 42, for example, which are inserted into receiving slots 44 at the side walls of the plug-in housing 12. In this exemplary embodiment, the rear end 43 of the plug-in housing 12 opposite the plug-in end 16 is closed by a plug cage 46 through which connecting pins 48 of the circuit board 30 extend. The plug cage 46 can be lockingly connected to the plug-in housing 12, for example (see the locking bosses 50 immersed into locking recesses 52 at the rear end 43 of the plug-in housing 12). For reducing the installation depth of the device 10 when the plug (not shown) is received by the plug cage 46 the plug cage 46 can be bent.

As can in particular be seen in FIGS. 1 and 2, the receiving means 20 comprises two opposite locking tabs 54 at its collar 26, which locking tabs respectively delimit a locking recess 56. The locking tabs 54 as a locking means 58 cooperate with locking hooks 60 on opposite sides of the plug-in end 16 of the plug-in housing 12. This is illustrated in FIGS. 4 to 7.

When the plug-in end 16 is being plugged into the receiving space 28 of the receiving means 20, the biasing means 18 comes into contact with the inner face 62 of the cover element 22 inside the receiving space 28. On the inner face 62 inside the receiving space 28 the cover element 22 is provided with a through-going opening 64 which serves for receiving and guiding the sensor housing 34 which projects beyond the through-going opening 40 at the plug-in end 16 of the plug-in housing 12 (see FIG. 3). In this exemplary embodiment, the biasing means 18 is configured in the form of two bent spring clips 66 forming spring elements 68 of the biasing means 18. The spring clips 66 are bulged in the plug-in direction, i.e. they have concave sides 70 pointing in the plug-in direction 14. When these spring clips 66 press against the cover element 22 they expand, whereby they generate a biasing force opposite to the plug-in direction 14.

When the plug-in end 16 is inserted into the receiving means 20, the locking hooks 60 move past the locking tabs 54 of the locking means 58. The locking hooks 60 have locking surfaces 72 essentially extending perpendicularly to the plug-in direction 14, which locking surfaces cooperate with the edges at the end of the locking recesses 56 facing away from the cover element 22. These edges of the locking recesses 56 thus form locking surfaces 74 at the receiving means 20 which, like the locking surfaces 72 of the locking hooks 60, extend perpendicularly to the plug-in direction 14. Instead of a perpendicular orientation of the previously described locking surfaces, they can also extend at an acute angle to the plug-in direction 14 for increasing the locking effect and thus cooperate according to a barbed-hook principle.

Figure 4:
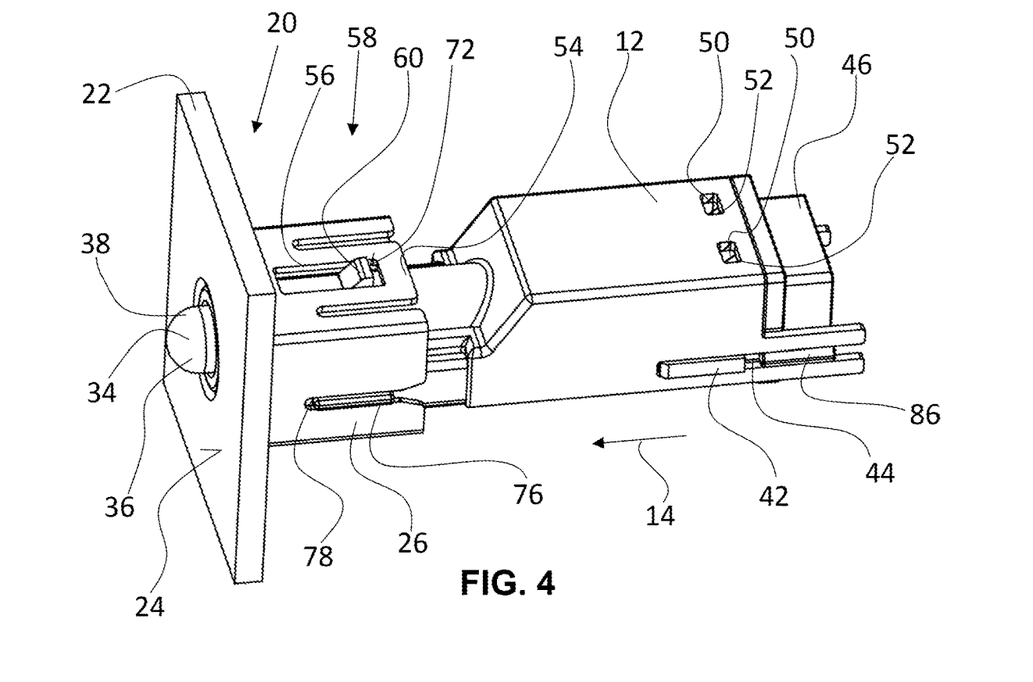
FIG. 4 shows a perspective view of the situation in which the plug-in housing (with the circuit board located therein in the predefined position) is plugged into the receiving means of the cover element beyond the plug-in depth defined by the locking means.
Figure 5:
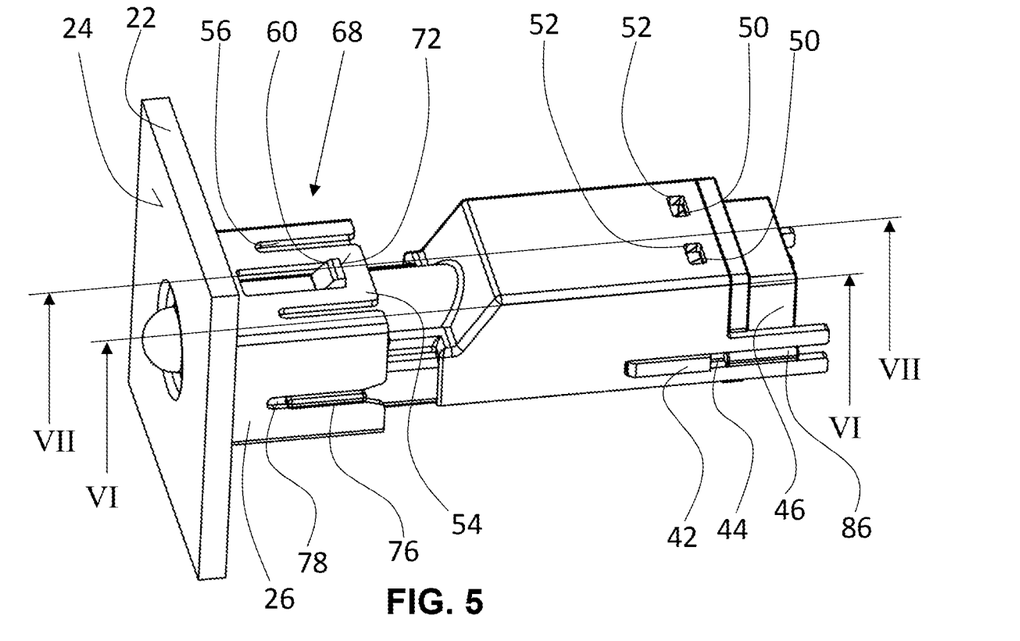
FIG. 5 shows the situation in which the plug-in housing is moved back opposite to the plug-in direction up to the plug-in depth defined by the locking means due to the provision of the biasing means.
Figure 6:
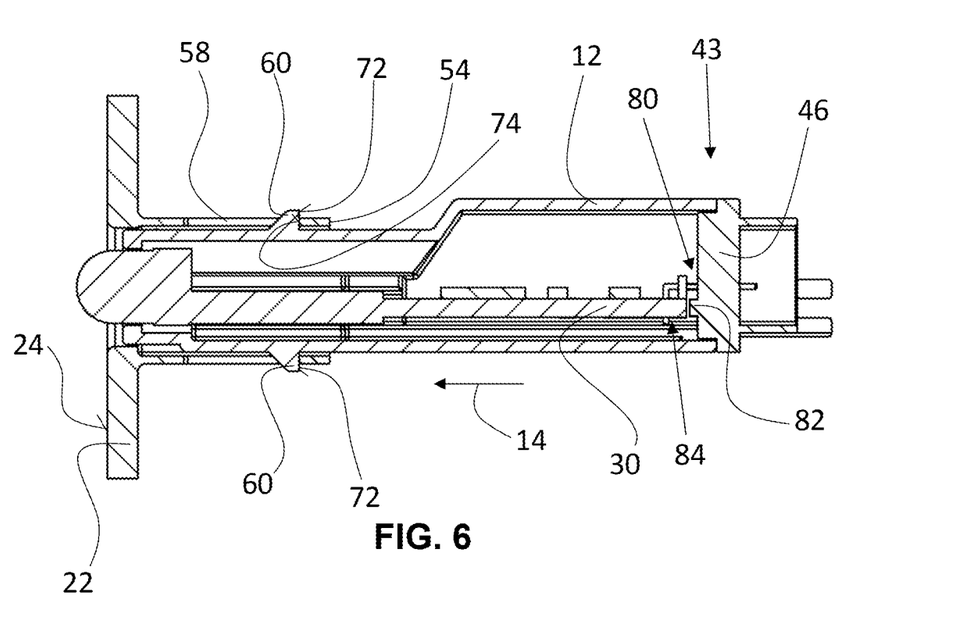
FIGS. 6 and 7 show sectional views along the lines VI-VI and VII-VII of FIG. 5.
Figure 7:
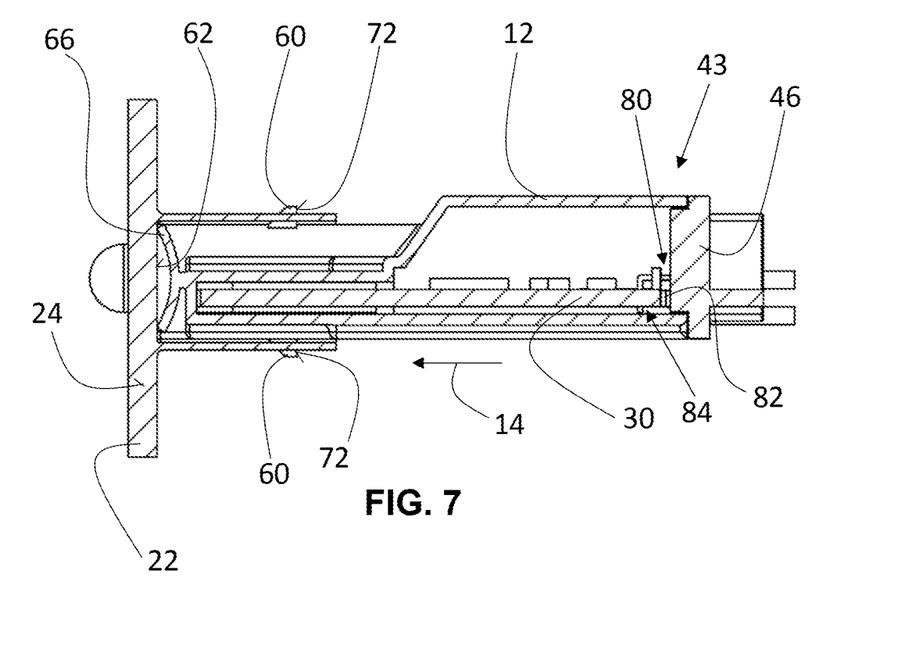

FIG. 4 shows the situation in which the plug-in housing 12 is inserted into the receiving means 20 to such an extent that the locking hooks 60 are moved past the rear ends of the locking recesses 56 facing away from the cover element 20. The spring clips 66 are tensioned (i.e. expanded) and now automatically move back the plug-in housing 12 opposite to the plug-in direction 14 when the plug-in housing 12, when being manually assembled, is released or, in the case of automatic assembly, is no longer in engagement with the assembling tool. The plug-in housing 12 automatically assumes the position shown in FIG. 5, which is shown in a sectional view in FIG. 6. The corresponding locking surfaces 72, 74 of the locking means 58 abut on each other thus defining the plug-in depth and the plug-in position of the plug-in housing 12. The sensor housing 34 is now positioned as predefined.

As can be seen in the Figures, the plug-in end 16 can be guided in the receiving means 20 with the aid of lateral ribs 76 which, in this exemplary embodiment, can serve for mechanical coding. These lateral ribs 76 are arranged at different heights on both sides of the plug-in end 16 of the plug-in housing 12 and are received by receiving slots 78 at the collar 26 of the receiving means 20. An unintended faulty orientation of the plug-in housing 12 rotated by 180° (i.e. reversed) as compared to the illustration in the Figures occurring during the assembly will thus be recognized, whereby assembly errors are reduced.

Inside the plug-in housing 12 the circuit board 30 assumes a position defined by abutment surfaces of the circuit board 30 and the plug-in housing 12 supported by spring clips 80 of a biasing means 82 at the plug cage 46 which press against the rear end 84 of the circuit board 30 with a biasing force acting on the circuit board 30 being generated. The guiding projections 42, for example, of the circuit board 30 abut on the front (closed) end of the receiving slots 44 of the plug-in housing 12 (see FIGS. 4 and 5). In the receiving slots 44 lateral guiding projections 86 at the plug cage 46 can be guided. Thus the interior temperature sensor 36 projecting beyond the front end 32 of the circuit board 30 as well as the radiation sensor 38, which are definedly arranged in the sensor housing 34, respectively assume the position predefined with regard to the functionality of the device 10 inside the through-going opening 64 of the plug-in housing 12 and the latter assumes its position inside the receiving means 20.

LIST OF REFERENCE NUMERALS

10 Device
12 Plug-in housing
14 Plug-in direction
16 Plug-in end
18 Biasing means
20 Receiving means
22 Cover element
24 Front side
26 Collar
28 Receiving space
30 Circuit board
32 Front end of circuit board
34 Sensor housing
36 Interior temperature sensor
38 Radiation sensor
39 Temperature sensor
40 Through-going opening
42 Guiding projections at the circuit board
43 Rear end of the plug-in housing
44 Receiving slot
46 Plug cage
48 Connecting pins
54 Locking tabs
56 Locking recesses
58 Locking means
60 Locking hooks
62 Inner face
64 Through-going opening
Spring clip
66 Spring element
68 Concave sides of the spring clips
70 Locking surfaces at the plug-in housing/plug-in end
74 Locking surfaces at the receiving means
76 Ribs
78 Receiving slots
80 Spring tongues
82 Biasing means at the plug cage
84 Rear end of the circuit board
86 Guiding projections at the plug cage

The invention claimed is:

1. A device for measuring the temperature in the interior of a vehicle, comprising:
  a plug-in housing for plugging into a receiving means on the rear side of a cover element adjacent to the interior,
  wherein the receiving means comprises a receiving space and the cover element inside the receiving space comprises a through-going opening and the plug-in housing comprises a plug-in end for plugging into the receiving means,
  a locking means for lockingly connecting the plug-in housing to the receiving means with the plug-in end of the plug-in end of the plug-in housing being plugged into the receiving space,
  an interior temperature sensor arranged at and/or in the plug-in end of the plug-in housing,
  wherein the interior temperature sensor projects beyond the plug-in end of the plug-in housing, and
  a first biasing means for biasing the plug-in housing away from the cover element for assuming a defined plug-in position of the plug-in housing when the plug-in end of the plug-in housing is plugged into the receiving space when being locked with the receiving means and the interior temperature sensor is arranged in the through-going opening of the cover element,
  wherein a circuit board is arranged in the plug-in housing and having a front end facing the plug-in end of the plug-in housing,
  wherein the circuit board carries the interior temperature sensor at least partially projecting beyond the front end thereof and further components as well as conductor traces,
  wherein the plug-in housing comprises at its plug-in end a through-going opening through which the interior temperature sensor extends and projects beyond the plug-in end of the plug-in housing, and
  wherein the plug-in housing comprises at its rear end facing away from the plug-in end a closing element for receiving a plug for the electric connection and the closing element comprises a second biasing means for biasing the circuit board towards the plug-in end of the plug-in housing.

2. The device according to claim 1, wherein the first biasing means is arranged at the receiving means and/or at the plug-in housing and comprises at least one spring element which, when abutting on the receiving means, exerts a pressing force on the plug-in housing for defining the plug-in depth of the plug-in end of the plug-in housing in the receiving space of the receiving means.

3. The device according to claim 2, wherein the at least one spring element is configured as a helical pressure spring or as a yoke or leaf spring or as a spring tongue or as an elastically compressible element or as a reversibly elastically deformable element.

4. The device according to claim 1, wherein the first biasing means comprises two spring elements arranged at the plug-in end of the plug-in housing on both sides of the interior temperature sensor for elastically abutting on the cover element on both sides of the through-going opening thereof.

5. The device according to claim 4, wherein each spring element is configured as a spring clip which is bent and comprises a convex as well as a concave side, and in the case of elastic abutment of the cover element and locking of the plug-in housing with the receiving means the concave sides of the spring clips are arranged such that they face the cover element.

6. The device according to claim 1, wherein the receiving means comprises a continuous or discontinuous collar projecting from the cover element, which, together with the cover element, defines the receiving space of the receiving means.

7. The device according to claim 1, wherein the plug-in housing, the locking means, the receiving means and the first biasing means are made from a plastic material or comprise a plastic material.

8. The device according to claim 1, wherein the interior temperature sensor is arranged in a sensor housing or embedded in the material of a sensor housing, and that the sensor housing at least partially projects beyond the plug-in end of the plug-in housing.

9. The device according to claim 8, wherein the sensor housing comprises a front wall adjacent to the interior, wherein the interior temperature sensor is thermally coupled to the front wall of the sensor housing, and/or a radiation sensor is provided for receiving solar radiation for compensating for heating of the sensor housing sensed by the interior temperature sensor and caused by radiation to which the sensor housing is exposed, and/or in the plug-in housing a second temperature sensor is arranged for sensing parasitic heating of the plug-in housing and/or the sensor housing for compensating for the effect on the temperature sensing by the interior temperature sensor.

10. The device according to claim 9, wherein the radiation sensor is arranged in the sensor housing.

11. The device according to claim 1, wherein the closing element is a plug cage.

12. The device according to claim 1, wherein the second biasing means of the closing element comprises at least one spring tongue for elastically abutting on the rear end of the circuit board.

13. The device according to claim 1, wherein the locking means comprises at least one pair of cooperating locking surfaces extending at an angle to the plug-in direction, wherein the one locking surface is arranged at the plug-in housing and the other locking surface is arranged at the receiving means, and wherein the plug-in housing, after its locking surface, when being plugged into the receiving means, has been moved past the locking surface of the latter with a biasing force or a further biasing force being generated by the first biasing means, is adapted to be further advanced in the plug-in direction until it is blocked by the cover element and is adapted to be automatically moved back due to the biasing force of the first biasing means until the locking surface of the plug-in housing abuts on the locking surface of the receiving means.

14. The device according to claim 13, wherein the locking surfaces of the locking means extend perpendicularly to the plug-in direction, and/or the locking surface is arranged at the plug-in end of the plug-in housing and the other locking surface is arranged at a collar at least also defining the receiving space of the receiving means and projecting from the cover element.

\* \* \* \* \*